United States Patent
Luedtke et al.

(10) Patent No.: US 9,378,222 B2
(45) Date of Patent: Jun. 28, 2016

(54) UPDATING METHOD FOR DATABASES, IN PARTICULAR NAVIGATION DATABASES

(75) Inventors: Dirk Luedtke, München (DE);
Alexander Starke, Lennestadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1912 days.

(21) Appl. No.: 12/309,617

(22) PCT Filed: Jul. 6, 2007

(86) PCT No.: PCT/EP2007/056886
§ 371 (c)(1),
(2), (4) Date: Oct. 28, 2009

(87) PCT Pub. No.: WO2008/012190
PCT Pub. Date: Jan. 31, 2008

(65) Prior Publication Data
US 2010/0076928 A1    Mar. 25, 2010

(30) Foreign Application Priority Data
Jul. 25, 2006 (DE) .......................... 10 2006 034 407

(51) Int. Cl.
*G06F 17/30* (2006.01)
*G01C 21/32* (2006.01)

(52) U.S. Cl.
CPC .......... *G06F 17/30241* (2013.01); *G01C 21/32* (2013.01)

(58) Field of Classification Search
CPC .......................... G01C 21/32; G06F 17/30241
See application file for complete search history.

(56) References Cited

U.S. PATENT DOCUMENTS

| | | | |
|---|---|---|---|
| 6,473,770 B1 * | 10/2002 | Livshutz et al. | 701/414 |
| 6,937,936 B2 | 8/2005 | Nimura | |
| 7,050,905 B2 * | 5/2006 | Nemeth | 701/201 |
| 2004/0117108 A1 * | 6/2004 | Nemeth | 701/200 |
| 2004/0267441 A1 * | 12/2004 | Kim | 701/200 |
| 2005/0058155 A1 * | 3/2005 | Mikuriya et al. | 370/474 |

(Continued)

FOREIGN PATENT DOCUMENTS

| DE | 103 18 615 | 11/2003 |
|---|---|---|
| EP | 1 473 543 | 11/2004 |

(Continued)

OTHER PUBLICATIONS

Otto, Hans-Ulrich et al., "Specification of actualisation strategies, map components version control and interface, 2003, ActMAP, pp. 1-123".*

(Continued)

*Primary Examiner* — Dinku Gebresenbet
(74) *Attorney, Agent, or Firm* — Norton Rose Fulbright US LLP

(57) ABSTRACT

A method for updating a decentralized database, in particular a navigation database, that is subdivided into segments, by transmitting an updated segment from a central database subdivided into corresponding segments to the decentralized database, and by storing the updated segment in the decentralized database avoids inconsistencies in an only stepwise update in that the segments are modeled to a hierarchical model in the decentralized database, and in the updating of the segment the particular segments from which the segment depends are updated as well.

6 Claims, 2 Drawing Sheets

(56) References Cited

U.S. PATENT DOCUMENTS

2005/0060069 A1* 3/2005 Breed et al. .................. 701/29
2006/0241854 A1* 10/2006 Tu et al. ...................... 701/202
2007/0106463 A1* 5/2007 Nomura ....................... 701/208

FOREIGN PATENT DOCUMENTS

| EP | 1 508 777 | 2/2005 |
| EP | 1 643 395 | 4/2006 |
| JP | 59 146339 | 8/1984 |
| JP | 2003-315055 | 11/2003 |
| JP | 2004-70323 | 3/2004 |
| JP | 2005-3700 | 1/2005 |
| JP | 2005-78066 | 3/2005 |

OTHER PUBLICATIONS

Bastiaensen E et al: "Specification of actualisation strategies, map components version control and interfaces" Internet Citation, [Online] Aug. 28, 2003, XP002391250 Retrieved from the Internet: URL :http://www.ertico.com/download/actmap_public_documents/2_065v11-D31-final.pdf> Seiten 42-52, Paragraph 6.3 "Partioning and version control" und updates; Seiten 75-79, Paragraph 8.3. "Conceptual data model of ActMAP updates".

Ooi, B.C. et al., "Extending a DBMS for Geographic Applications", Proceedings of the Fifth International Conference on Data Engineering, Los Angeles, CA, IEEE Comput. Soc. Pr., Feb. 1989, pp. 590-597.

* cited by examiner

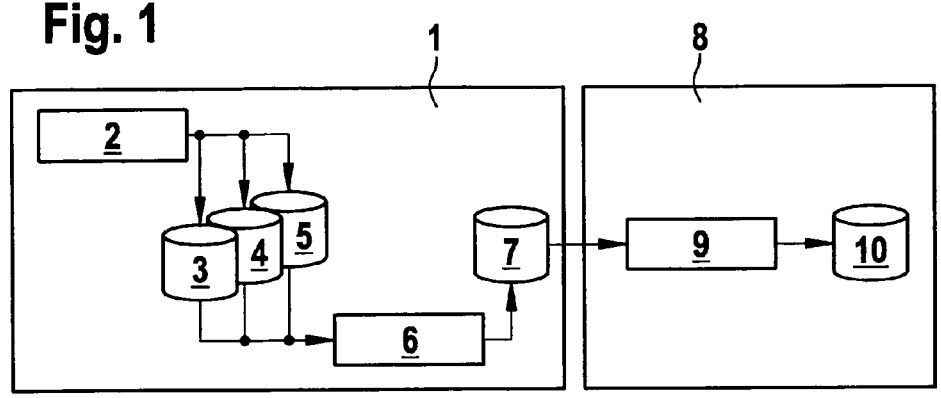
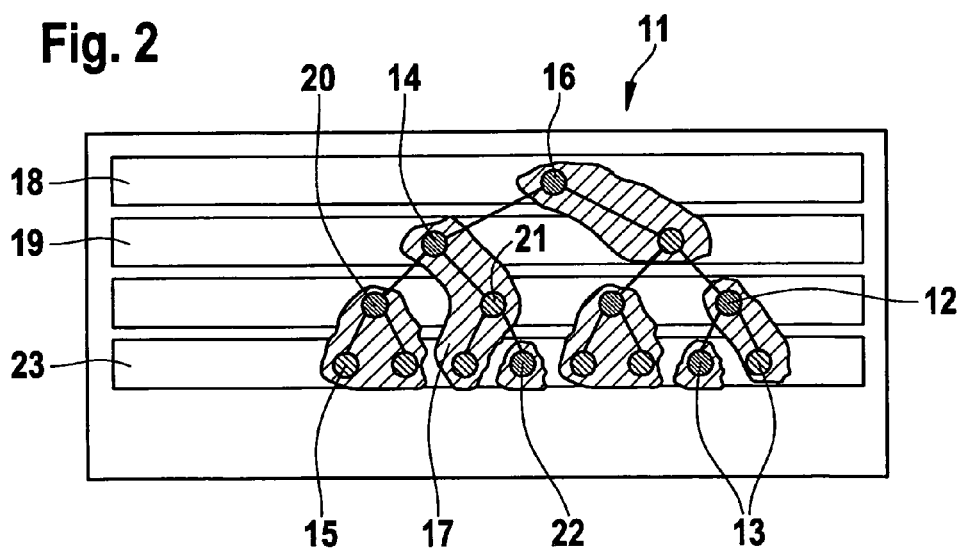

UPDATING METHOD FOR DATABASES, IN PARTICULAR NAVIGATION DATABASES

FIELD OF THE INVENTION

The present invention relates to a method for updating a decentralized database, in particular a navigation database, that is subdivided into segments, by transmitting to the decentralized database an updated segment from a central database subdivided into corresponding segments, and by storing the updated segment in the decentralized database.

BACKGROUND INFORMATION

Current navigation systems include comprehensive databases in which, for instance, data are stored of a digitized map, data for inputting the destination, for route search and display and for destination guidance while indicating the current position of a vehicle. Furthermore, the databases may include additional data for driver-assistance systems.

The user of a database is interested in having the information included in the database in its most recent form, if possible. For instance, the value of a navigation database is reduced for the driver if the road network forming the basis of the database has changed or if a temporary traffic disturbance cannot be taken into account because the navigation database lacks pertinent information. Another example are computer applications that rely on current data.

A decentralized database is usually updated in such a way that the availability of new data is checked in a data center and a new version of the database is provided, if appropriate. When a new version of the database is available, then they are compiled and stored in an update database. The decentralized system, e.g., the navigation system in the vehicle, downloads suitable updated data from this updating database and integrates it into its decentralized database.

The updating of a database may be implemented in full or in part.

A complete update offers the advantage that the entire data stock is mutually adapted. However, it is disadvantageous that a complete update frequently entails unnecessary cost and time for the user. This is the case, for example, when data are transmitted that either have not changed or which are unnecessary for the user and the cost depends on the data volume.

To reduce the data quantities arising in connection with an update step, it is therefore not possible to update the entire database in a single step, but it is always updated only in part. To this end, the content of the database is subdivided into individual segments, e.g., according to geographical and/or thematic considerations or a combination thereof.

However, problems may arise in the updating implemented in incremental steps because the database may lose its consistency. That means that possible relationships with other segments are severed by the updating of a partial region. It is conceivable, for example, that in an update a street segment is deleted in one segment, to which another, not updated segments still refers by a street connection. Such inconsistencies must be avoided in an update in incremental steps.

A common procedure for avoiding inconsistencies in the update of a database is to subdivide the database into segments that do not overlap, each of which is then assigned a version identifier. Due to the dependencies between individual segments of the database, not every combination of versions will lead to a consistent state. Therefore, the data center and/or the decentralized system must ensure that each updating of the decentralized database results in a consistent combination of versions. The time and expense involved in this safeguarding increases with the number of dependencies among the individual segments. In an effort to reduce such dependencies, the particular segments of the database that must be checked in an update operation are formed in such a way that the number of relationships between the segments is minimized.

Another problem in an updating of the database in incremental steps is what is known as the avalanche effect. This means that, despite the user's wish to update merely one segment of the database, many versions of many segments of the database must be updated as well in order to obtain a consistent combination of versions. This in turn results in increased expense and an increased time requirement.

Avalanche effects may be contained by subdividing the database into smaller segments. However, smaller segments of the database whose versions must be checked result in a larger number of such segments. This also increases the required maintenance and the required memory space for the version control. In addition, the likelihood of what is known as structural changes is higher, which are to be understood as the addition or deletion of segments of the database whose versions are checked. Structural changes can be administered only with the aid of auxiliary structures.

SUMMARY OF THE INVENTION

Against this background it is an object of the present invention to enable an improved consistent updating of any segments of a database.

This objective may be achieved by a method of the type described in the introduction, in that the segments in the decentralized database are modeled to a hierarchical model and when updating the segment in the decentralized database, the particular segments from which the segment depends are updated as well.

Updating a segment thereby does not create any inconsistency of the database because the particular segments from which it depends are updated too.

The hierarchical data structure also allows the storing of relative paths, so that the storage and transmission of the updated segments is carried out more efficiently than before and the required maintenance of the database is reduced. The decentralized database is expediently modeled to a tree structure.

A subdivision into segments may be accomplished by defining what is known as versioned nodes in the decentralized database, and each of the segments is formed by one versioned node as root as well as all subordinate nodes that are not versioned nodes, and their successors. In this instance the terms node and root are not limited to tree structures but are applied to hierarchical data structures in general. Accordingly, a node represents a data element or a data quantity of the database.

A root of the entire database is to be understood as the particular node that hierarchically is situated at the highest level of the database; the root of a segment is to be understood as the particular node that hierarchically is disposed at the highest level within the segment. The versioned nodes are a partial quantity of all nodes of the data tree to whose elements the root of the tree belongs.

In the individual case, the number of versioned nodes and their distribution in the database may be selected according to practical considerations. The number and the definition of the versioned nodes is usefully implemented such that the data that in all likelihood are updated frequently are contained in segments that have no or only a few subordinate segments.

This makes it possible to prevent that updating of a segment turns into an avalanche-like updating. Furthermore, it is also not impossible to exclude portions of the database, e.g., global directories, from the afore-described versioning. Some other manner must then be used fort these portions to ensure that no inconsistencies occur when portions of these data are updated.

To allow the versions of a particular segments to be differentiated, each segment is assigned a version identifier. The version identifier may consist of a whole number, for instance.

There are various possibilities for handling the version identifier of a subordinate segment (B) when a superposed segment (A) changes: 1) The version identifier of segment (B) is retained in unchanged form if segment (B) has not changed; the version identifier of segment (B) is incremented if segment (B) has changed. 2) The version identifier of segment (B) is reset (for instance to zero), regardless of whether segment (B) has changed or not. The reset also resets the version identifiers of all segments that are subordinate to segment (A). 3) The version identifier of segment (B) is optionally retained in unchanged form or will be reset. The choice may be implemented at random or in a situation-specific manner.

However, the version identifier may also contain additional information, e.g., information about the content and the format of the data within a segment and/or about the structure of subordinate segments. The version identifier is stored within the associated segment or in a central list of the decentralized database. In this way the version identifier of a segment is available even at a later point in time.

In one exemplary embodiment, a check for each new version identifier of a segment takes place within the data center in order to ascertain which versions of other segments are consistent with the new version identifier. This task may be carried out by an update compiler, for example. For one, the consistency of the decentralized database is ensured in this way. For another, changes in the database, in particular changes in the content, format and/or structure, may be made without necessitating an additional consistency check within the decentralized system.

The check for consistency requires that the version of a versioned segment is able to be addressed unambiguously. This may be done by a version path. This is a vector whose components are made up of the version identifiers of the versioned segment and the version identifiers of all subordinate versioned segments. In this way dependent subordinate versions are allowed. However, it is also possible to address the version of a versioned segment by its version identifier, such as a whole number.

In order to allow high mobility of a system, e.g., a navigation system, with the decentralized database, the transmission of the updated segments may be implemented wirelessly. This may be done, for example, via a radio or wireless transmission or via a mobile telecommunications link. As an alternative, a data transmission via exchangeable memory media is conceivable as well. However, it is also possible to implement the transmission of the updated segments via the Internet.

In the following, the present invention is explained in detail with reference to the attached drawing.

BRIEF DESCRIPTION OF THE DRAWINGS

FIG. 1 shows an overview of an updating system.

FIG. 2 shows an example of a hierarchically structured database.

DETAILED DESCRIPTION

Figure 3:
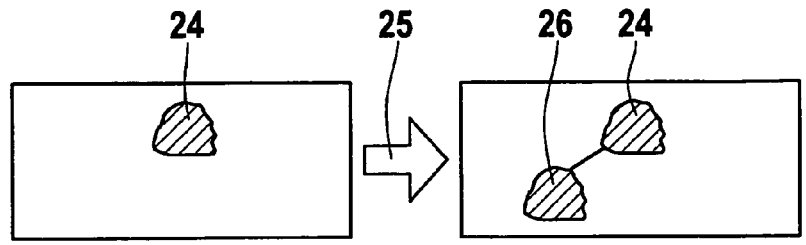
FIG. 3 shows, schematically, the addition of a subordinate update segment.

The following representation is based on a navigation system. However, the present invention is not limited to navigation systems but may be used wherever updated data are required and have to be incorporated into a database. The downloading of updated versions of games or application programs from the Internet are mentioned as an example.

FIG. 1 shows a data center 1. Navigation databases are compiled within the data center. The navigation databases include, for example, information about the road network or what is known as points of interest, e.g., locations of gas stations, hotels or landmarks.

Data center 1 includes a data compiler 2, which collects and compiles data. Data compiler 2 collects data that are necessary or useful for a navigation database, such as the aforementioned data about the road network. From these data, data compiler 1 composes updates 3, 4, 5 of the raw data of the navigation database. In FIG. 1, the three cylinders represent three updates 3, 4, 5 of the navigation database for three consecutive years. Each update 3, 4, 5 includes the entire data stock of raw data of the underlying navigation database. Changes in the data in comparison to an update 3, 4 from a previous year need not necessarily apply to the entire data stock. For instance, it is conceivable that the data of the road network have changed only in one regional area, although the raw data include the road network for an entire country.

An update compiler 6 checks an update 3, 4, 5 put together by data compiler 2 with respect to where the data stock has changed as compared to previous update 3, 4. If update compiler 6 detects a change, then it provides update 3, 4, 5 in an update database 7. From update database 7, these data are then able to be transmitted to a decentralized system 8 or be retrieved by decentralized system 8.

Decentralized system 8 in the exemplary embodiment shown here is a navigation system that is installed in a vehicle. Decentralized system 8 includes an update integrator 9, which retrieves the data from the update database and transfers them into decentralized system 8. Update integrator 9 thereupon updates a decentralized database 10 within decentralized system 8, i.e., the navigation database in the vehicle in the case at hand.

In FIG. 2, a database 11 is modeled to the structure of a data tree, more precisely: a binary tree, in which at most two subordinate nodes 13 branch off from a node 12.

However, it is not a precondition of the present invention that data base 11 be modeled to a tree structure. It is merely required that a hierarchical data structure is involved or, at the very least, that it is able to be transformed into a hierarchical data structure. One simple possibility for projecting a data structure set up without a hierarchy into a hierarchical structure consists of seeing the entire database as the root of a tree, each segment of the database being treated as a node that is directly subordinated to the root. However, a deeper data structure may be desired as well. This may be achieved by using XML (extensive markup language), for instance. In this case, each XML element may be considered a node in the hierarchical data model.

Database 11 has two different classes of nodes 14, 15: one class forms the quantity of versioned nodes 14, the other class the quantity of non-versioned nodes 15. The number and distribution of versioned nodes 14 within database 11 defines the mutual dependency of the data that must be taken into account in an update of database 11. The subdivision into the two classes is random, with the one exception that root 16 must represent a versioned node 13.

Versioned nodes 14 and non-versioned nodes 15 are combined into versioned segments 17. Versioned segments 17 are represented by dotted lines in FIG. 2. Each versioned segment 17 is made up of a versioned node 12, 14, 16 and possibly all non-versioned nodes 15 depending from, i.e., subordinate to, this versioned node 12, 14, 16, as well as their non-versioned successors. Each versioned segment 17 thus includes precisely one versioned node 12, 14, 16. The importance of versioned segment 17 consists of the fact that it can be updated only in its entirety, even if only a few parts of its data have changed.

Database 11 is now to be explained in greater detail with the aid of data for a navigation database.

Root 16 of the data tree forms a highest level 18, which is also known as database level. Root 16 represents the road network map of an entire country. In a second level 19, the directory level, node 14 represents a limited geographic region within the country. In a next level 20, referred to as data file level, lies a versioned node 20, which is subordinate to node 14 and includes information about points of interest of the geographic region represented by node 14. Versioned node 14 has an additional subordinate node 21, which includes information in connection with road maps of the geographic region. Node 21 has a subordinate node 22, which lies within a fourth level 23, which is known as element level. Node 22 includes a 3D-representation of houses on the streets that are represented by node 21. The data tree could also include additional levels such as additional directory levels or attribute levels.

In the following text the way in which the subdivision of database 11 affects the individual versioned segments 17 will be discussed in greater detail.

If database 11 is modified to the effect that the user no longer is interested in the points of interest of the geographic region represented by node 14, then the versioned segment defined by versioned node 20 as root may be deleted without necessitating an updating of versioned segment 17. This follows from the fact that the deleted points of interest belong to a versioned segment that is subordinate to versioned segment 17. In contrast, if data pertaining to the road maps in node 21 are to be changed, then the entire versioned segment 17 must be updated.

FIG. 3 in the left box shows a versioned segment 24 at a specific point in time. The database then is updated once, which is indicated by an arrow 25. The update consists of adding a versioned segment 26 to the database. Versioned segment 26 is directly subordinate to versioned segment 24, i.e., there are no levels between them. Each versioned segment 24, 26 bears its own version, which is stored either in the particular versioned segment 24, 26 or in a central list outside of versioned segments 24, 26. Prior to the update, versioned segment 24 had a version identifier n, n representing a whole number. After adding subordinate versioned segment 26, the version identifier of versioned segment 24 is incremented by one, i.e., versioned segment 24 now bears version identifier n+1. Added versioned segment 26 receives the version identifier 1 since it did not exist previously.

The storing of the versions of the individual versioned segments 24, 26 is important for the reason that versioned segments 24, 26 are able to be properly updated only in a step-by-step manner with increasing versions. This also ensures that, if a version number of a versioned segment is known, the time status of this versioned segment is able to be reconstructed.

Figure 4:
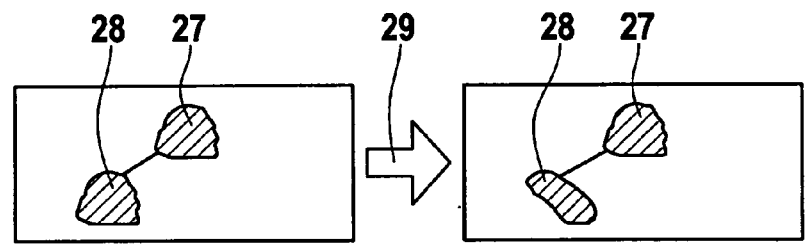
FIG. 4 shows, schematically, the modification of a subordinate update segment.

FIG. 4 shows a versioned segment 27 at a particular point in time, to which a versioned segment 28 is subordinated. Versioned segment 27 has version identifier n, versioned segment 28 has version identifier m, m and n being whole numbers. During an update operation, which is indicated by an arrow 29, versioned segment 28 is modified. As a result, the version identifier of versioned segment 28 is incremented by 1, so that is now reads m+1. The version identifier of versioned segment 27 remains unchanged.

Figure 5:
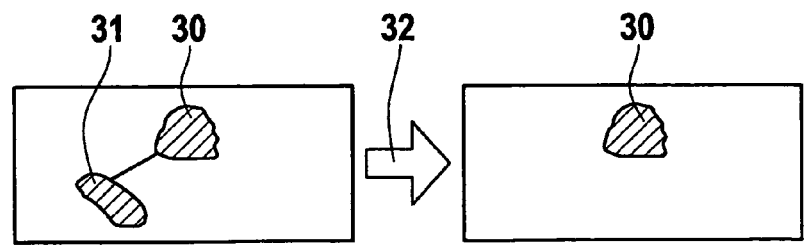
FIG. 5 shows, schematically, the removal of a subordinate update segment.

FIG. 5 shows a versioned segment 30 together with a versioned segment 31 at a specific point in time. Versioned segment 30 has version identifier n, versioned segment 31 has version identifier m, m and n being whole numbers. Following an updating operation, which is indicated by an arrow 32, versioned segment 31 has been removed. This causes the version identifier of versioned segment 30 to be incremented by 1, and now it reads n+1.

What is claimed is:

1. A method for updating a decentralized database for navigation that is divided into segments, the method comprising:
    transmitting an updated segment from a central database, subdivided into corresponding segments, to the decentralized database;
    storing the updated segment in the decentralized database;
    wherein the segments are modeled to a hierarchical model in the decentralized database,
    wherein in the updating of the segment, updating particular segments from which the segment depends, and
    wherein versioned nodes are determined in the decentralized database, and each segment is formed from one versioned node and all subordinate nodes which are not versioned nodes.

2. The method of claim 1, wherein the hierarchical model has a tree structure.

3. The method of claim 1, wherein each of the segments is assigned a version.

4. The method of claim 3, wherein the version is represented by a whole number.

5. The method of claim 1, wherein the version is stored in one of an associated segment and a central data structure of the decentralized database.

6. The method of claim 1, wherein for each new version of a segment, a check is performed within a data center as to which versions of other segments are consistent with the new version.

* * * * *